United States Patent
Harris et al.

(10) Patent No.: US 11,697,508 B2
(45) Date of Patent: Jul. 11, 2023

(54) HYBRID AIRCRAFT AND LANDING LAUNCH/RECOVERY SYSTEM

(71) Applicant: Leigh Aerosystems Corporation, Carlsbad, CA (US)

(72) Inventors: Gordon L. Harris, Carlsbad, CA (US); Stephen L. Harris, Carlsbad, CA (US)

(73) Assignee: Leigh Aerosystems Corporation, Vista, CA (US)

( * ) Notice: Subject to any disclaimer, the term of this patent is extended or adjusted under 35 U.S.C. 154(b) by 494 days.

(21) Appl. No.: 16/995,534

(22) Filed: Aug. 17, 2020

(65) Prior Publication Data
US 2021/0047052 A1 Feb. 18, 2021

Related U.S. Application Data

(60) Provisional application No. 62/887,210, filed on Aug. 15, 2019.

(51) Int. Cl.
| | | |
|---|---|---|
| *B64U 70/00* | (2023.01) | |
| *B64F 1/00* | (2006.01) | |
| *B64F 1/08* | (2006.01) | |
| *B64C 29/00* | (2006.01) | |
| *B63G 11/00* | (2006.01) | |
| *B64C 3/56* | (2006.01) | |
| *B64U 70/80* | (2023.01) | |
| *B64U 80/84* | (2023.01) | |

(52) U.S. Cl.
CPC .............. *B64F 1/007* (2013.01); *B63G 11/00* (2013.01); *B64C 3/56* (2013.01); *B64C 29/0033* (2013.01); *B64F 1/08* (2013.01); *B64U 70/00* (2023.01); *B64U 70/80* (2023.01); *B64U 80/84* (2023.01)

(58) Field of Classification Search
CPC . B64F 1/007; B64F 1/08; B63G 11/00; B64C 3/56; B64C 29/0033; B64U 70/00; B64U 70/80; B64U 80/84
See application file for complete search history.

(56) References Cited

U.S. PATENT DOCUMENTS

| | | | | |
|---|---|---|---|---|
| 5,039,034 A | * | 8/1991 | Burgess ................. | B64F 1/125 114/261 |
| 8,453,966 B2 | * | 6/2013 | McGeer .................... | B64F 5/40 244/110 F |
| 2019/0106224 A1 | * | 4/2019 | Nishikawa ............... | B64F 1/22 |
| 2019/0308724 A1 | * | 10/2019 | Cooper ................... | B64F 1/222 |

FOREIGN PATENT DOCUMENTS

WO    WO-2016078822 A1 *    5/2016    .......... B64C 39/024

* cited by examiner

*Primary Examiner* — Tye William Abell
(74) *Attorney, Agent, or Firm* — Mintz Levin Cohn Ferris Glovsky and Popeo, P.C.

(57) ABSTRACT

A hybrid aircraft system uses a combination of direct propeller driven gas engine and electric motor power to provide vertical thrust and control for hover of the aircraft. Furthermore, a portable launch/recovery system is configured for use with an aircraft such as a Vertical Takeoff and Landing (VTOL) Unmanned Air Vehicle (UAV). The system is configured to enable ships with limited available deck space to become UAV-compatible.

19 Claims, 6 Drawing Sheets

HYBRID AIRCRAFT AND LANDING LAUNCH/RECOVERY SYSTEM

CROSS REFERENCE TO RELATED APPLICATION

This application claims the benefit of priority under 35 U.S.C. § 119(e) to U.S. Provisional Patent Application Ser. No. 62/887,210, filed Aug. 15, 2019. The disclosures of the provisional application is incorporated by reference in its entirety.

BACKGROUND

Existing technology for the design of fixed-wing aircraft capable of vertical takeoff and landing (VTOL) has focused on the use of four battery-driven vertical-axis propellers to provide lift. The aircraft then includes a fifth powerplant (electric or petrol) to provide forward thrust.

Each of the four vertical thrusters consists of a battery pack, motor speed controller, wiring and propeller which collectively and substantially increase the overall weight of the aircraft. To limit this weight impact, designers have compensated by minimizing the size and power of the horizontal propulsion engine. But this limits the aircraft's operational ceiling and its top speed which restricts its ability to pursue targets and penetrate headwinds. There is thus a need for improved aircraft with vertical takeoff and landing capabilities.

In addition, recovery of a VTOL unmanned aerial vehicle (UAV) in high winds and elevated sea-safe conditions on ships at sea is an extremely challenging problem. This is true even if the ship provides a large amount of deck space for flight operations. For example, in Navy and Coast Guard non-aviation-capable patrol boats, deck space is either very limited or even unavailable due to the typically large amount of equipment stored on the ship deck. Even in cases where some flat deck space might be available for a UAV, the typical 4-ft high safety railings on many vessels pose a further hazard to larger wingspan UAV's descending to the deck. There is this a need for improved systems and methods for launch and recovery of a VTOL UAV.

SUMMARY

Disclosed herein is a hybrid aircraft system that uses a combination of direct propeller driven gas engine and electric motor power to provide vertical thrust and control for hover of the aircraft in which the engine effectively lifts its own weight while reducing the overall electrical system requirements. The system additionally uses only gas power and aerodynamic stability and control for forward flight. As such, this system enables a combination of efficient vertical lift performance and the forward flight efficiency of a conventional gas-powered aircraft without the disadvantages of prior configurations. In an embodiment, an alternator is directly connected to the engine and supplies electricity to the vertical lift motors during hover using half (or less) of the engine's total horsepower and minimizing the battery size and weight, because no stored energy is required to hover.

Also disclosed is a launch/recovery system for a Vertical Takeoff and Landing (VTOL) Unmanned Air Vehicle (UAV). The launch/recovery system can be used for launch, recovery, and maintenance including general accessing of a UAV and the storage of fuel, AV charger, starter, and tools. The launch/recovery system has many military and civilian applications such as coastal and offshore patrol by Coast Guard vessels. Such vessels can greatly benefit by having a UAV capability to surveil wide areas around Coast Guard vessels. However, such Coast Guard vessels (and other similar vessels) are not configured to be aviation capable. Although some such vessels have relatively flat aft or forward decks that might accommodate landing of a VTOL UAV, these decks are most often encumbered by various objects such as lifeboats, davits, tanks, etc. Even those that have relatively clear decks still have safety railings that are likely to jeopardize landings in higher sea states.

The details of one or more variations of the subject matter described herein are set forth in the accompanying drawings and the description below. Other features and advantages of the subject matter described herein will be apparent from the description and drawings, and from the claims.

DETAILED DESCRIPTION

Disclosed herein is a hybrid aircraft system that uses a combination of direct propeller driven gas engine and electric motor power to provide vertical thrust and control for hover of the aircraft. Also disclosed is a portable launch/recovery system for a Vertical Takeoff and Landing (VTOL) Unmanned Air Vehicle (UAV). The system is configured to enable ships with limited available deck space to become UAV-compatible.

Figure 1:
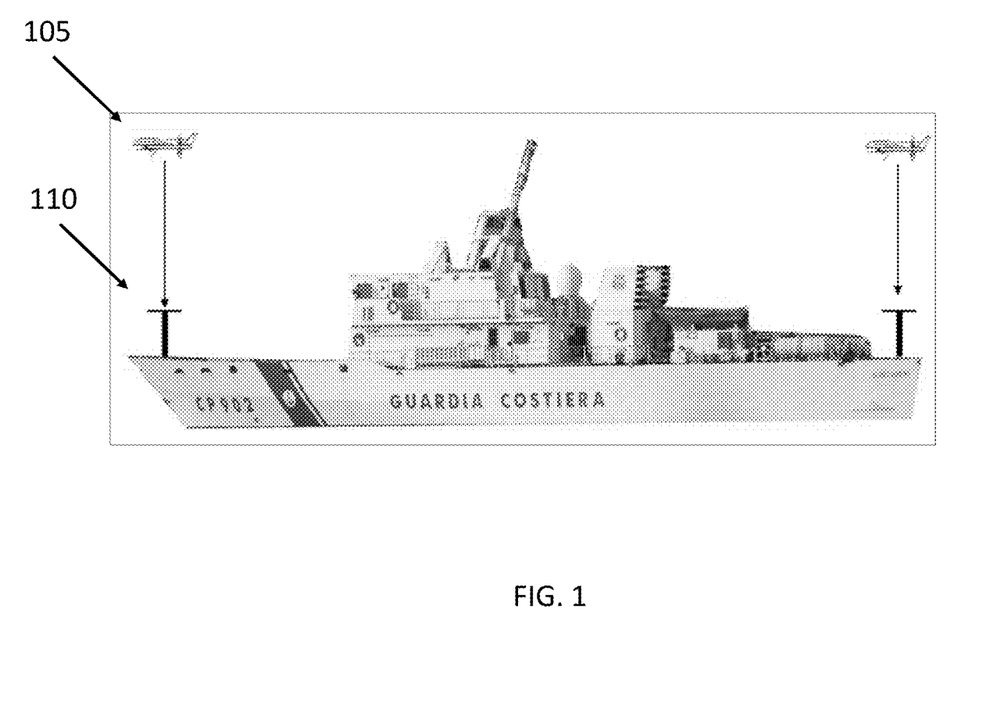
FIG. 1 shows an example watercraft.

FIG. 1 shows a side view of an example sea vessel (such as a Coast Guard vessel in a non-limiting embodiment) with a launch/recovery system 110 positioned on the vessel. The launch/recovery system can also be referred to as a platform or deck. It should be appreciated that the locations of the system 110 on the vessel are for example purposes only and that the locations can vary.

The type of aircraft configured to take off and land on the system 110 can vary. In an embodiment, the aircraft is a VTOL UAV aircraft 105.

Hybrid Aircraft System

Figure 2A:
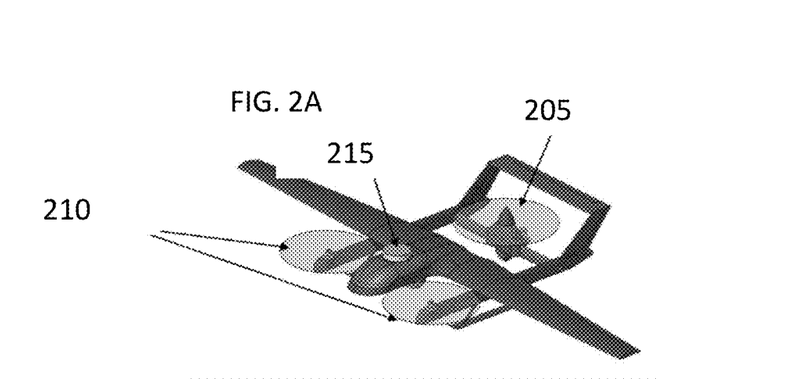
FIGS. 2A and 2B show an example of a hybrid vertical takeoff and landing (VTOL) aircraft.
Figure 2B:
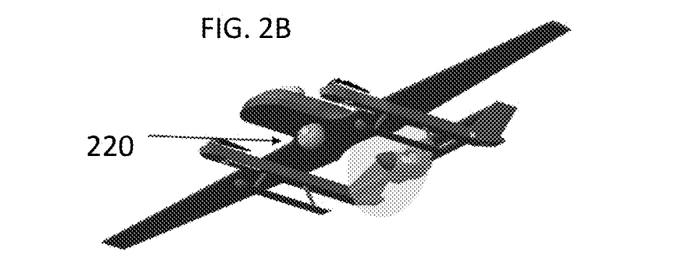

An embodiment of a hybrid aircraft has a hybrid lift and propulsion system that provides benefits of a quad copter with the utility of a high-performance airplane. FIGS. 2A and 2B show an example embodiment. The aircraft includes a pair of propellers 210 that are positioned on a forward location of the aircraft. The propellers 210 are configured to rotate between a vertical orientation and a horizontal orientation. The vertical orientation provides the propellers in vertical rotational axis orientation to provide vertical lift. The horizontal orientation provides the propellers in horizontal rotational axis orientation to provide forward thrust. The propellers 210 are powered by an electrical engine. The aircraft further includes a third propeller 205 on a rearward location of the aircraft. The propeller 205 is also configured to rotate between a similar vertical orientation and a horizontal orientation. The propeller 205 is powered by a gasoline engine.

The advantages of this configuration are that only half of the number of vertical thrusters are required, allowing the installation of a much more powerful engine for the same weight resulting in significantly higher airspeed and greater operational ceiling. Moreover, since the gasoline engine (which has thirty times the energy density of the best battery technology) is used for vertical thrust as well, the aircraft's hovering time is substantially increased over configurations using quad electric thrusters.

Aircraft Access Launch/Recovery System

Figure 3:
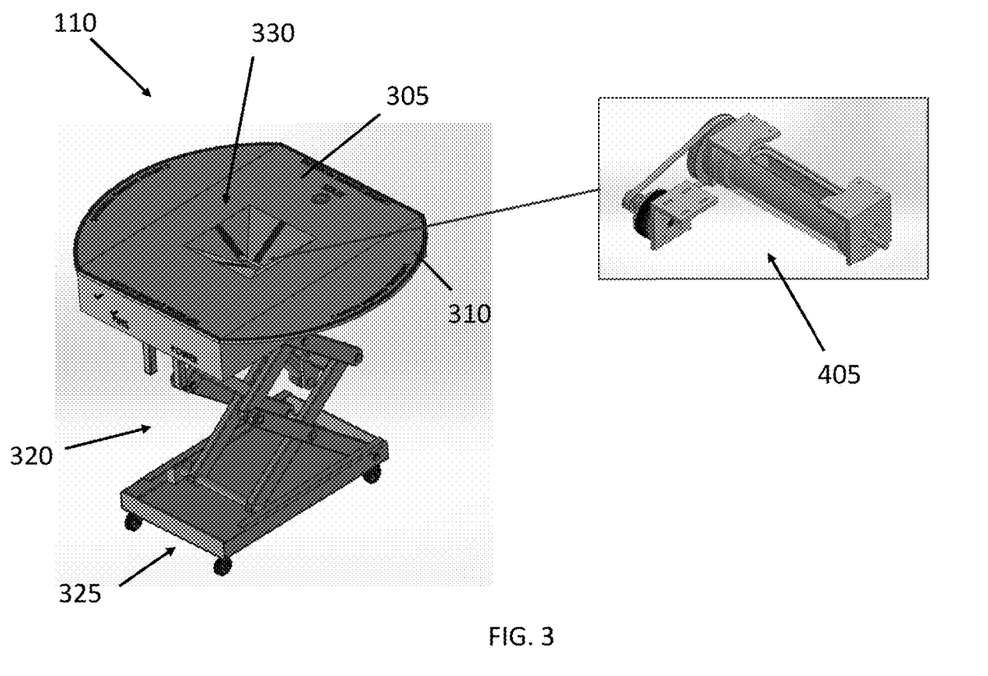
FIG. 3 shows a perspective view of an aircraft launch/recovery system.

FIG. 3 shows a perspective view of a launch/recovery platform system 110. The launch/recovery system 110 provides an elevated deck or platform with a horizontal surface configured to support an aircraft such as a VTOL UAV. A vertical height of the horizontal surface can be adjusted pursuant to an actuation mechanism, as described below. In an embodiment, the launch/recovery system 110 is portable and can be moved around an upper platform of a seacraft to a desired location. The launch/recovery system 110 includes an upper platform that is configured to transition between a reduced height position (e.g., a compacted state) and a relatively increased height position (e.g., an elevated state) with an increased vertical position relative to a surface upon which the launch/recovery system is positioned. In this regard, the launch/recovery system includes an expansion mechanism that mechanically expands, such as along a vertical axis, to increase a height of the upper platform. In an embodiment, the expansion mechanism can mechanically expand and contract while the aircraft is positioned atop the upper platform. In an embodiment, actuation of the expansion mechanism occurs by an aircraft hovering above the upper platform and dropping a tethered actuator into a bucket or opening of the upper platform. The tethered actuator interacts with a winch system to cause the winch system to rotate and actuate the expansion mechanism thereby expanding and/or contracting the expansion mechanism. The upper platform has an upper surface sized and shaped to support an aircraft.

With reference to FIG. 3, the launch/recovery system 110 includes an upper platform 305 that provides a surface upon which an aircraft can be supported such as during a takeoff, landing, and/or in a state of rest. The surface can be a horizontal flat surface although the contour may vary. The upper platform 305 includes one or more extender wings 310 that can transition between a furled or folded state and an unfolded state. FIG. 3 shows the wings 310 in the unfolded state where the wings have surfaces (such as upper surfaces) that align with the surface of the upper platform 305. Thus, the wings, when unfolded, thereby expand the total surface area of the upper platform 305. The wings 310 can also be transitioned into a folded state wherein the wings 310 fold downward and/or inward to provide a more compact overall shape for the launch/recovery system 110, as described further below.

The upper platform 305 is positioned atop an expandable structure 320, such as an accordion-like structure that sits upon a bottom base 325. The structure may be formed, for example, by a plurality of interconnected trusses that are rotatably connected at ends to expand and contract. The bottom base 325 may be positioned directly atop a surface such as the deck surface of a seacraft. The expandable structure 320 can transition between a folded state where the expandable structure is lowered relative to the bottom base 325 and an unfolded or expanded state where the expandable structure is partially or fully expanded such that the height of the upper platform 305 is increased relative to the bottom base 325. In this manner, the expandable structure 320 can raise and lower the height of the upper platform 305.

With reference still to FIG. 3, the upper platform 305 includes an opening 330 (or bucket) that leads to an internal location in which a winch mechanism 405 is positioned. The opening 330 can be defined by a plurality of movable surfaces that provide one or more inclined surfaces that funnel downwardly into a location where the winch mechanism is positioned. The winch mechanism 405 can be actuated to transition the expandable structure 320 between the folded and the expanded states and thereby lift and lower the upper platform 305. This is described in more detail below.

Figures 4A, 4B, 4C, 4D:
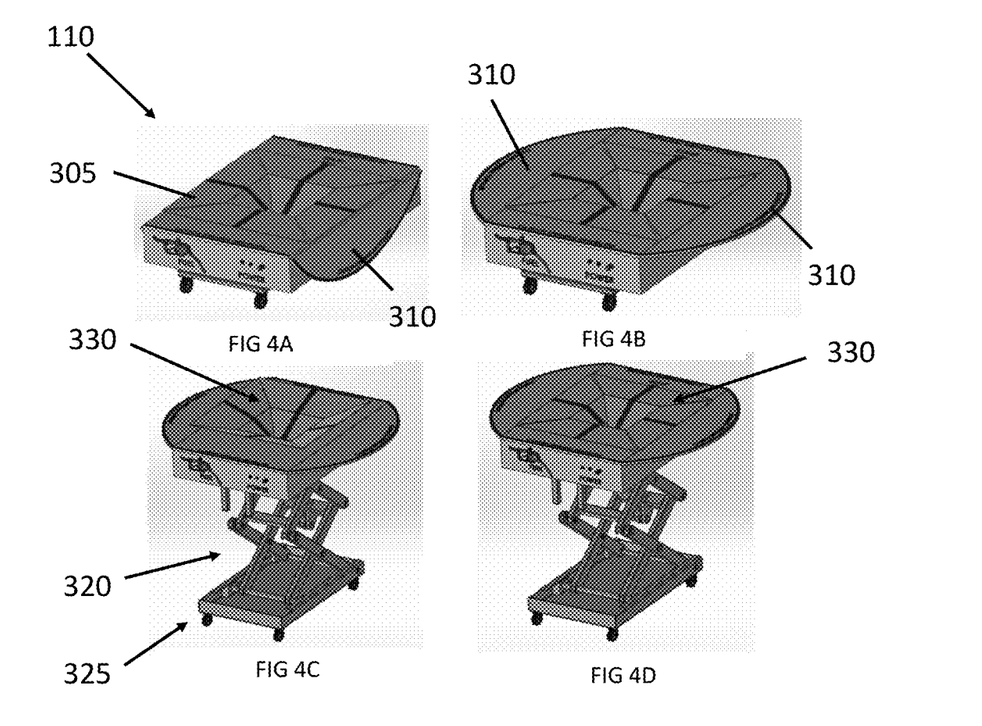
FIGS. 4A-4D show the launch/recovery system in various stages of movement.

FIG. 4A shows the launch/recovery system 110 in the compacted or folded state wherein the expandable structure 320 (FIG. 3) is folded such that the upper platform 305 is in a vertically reduced position. The wings 310 are also folded such that the upper platform 305 has a reduced surface area relative to when the wings 310 are expanded. The expandable structure 320, when folded, may be housed within a housing structure of the upper platform 305 and/or the bottom base 325.

FIG. 4B shows the launch/recovery system 110 with the wings 310 in the unfolded state such that the wings 310 increase the overall surface area of the upper platform 305. The wings 310 can be transitioned between the folded and the unfolded state automatically using a motor or upon the occurrence of a certain event. Or, the wings 310 can be manually transition between the folded and the unfolded state such as by a user. In an embodiment, the wings 310 automatically transition to the unfolded state as the upper platform 305 is raised and also automatically transition to the folded state as the upper platform 305 is lowered.

FIG. 4C shows the launch/recovery system 110 with the expandable structure 320 in the expanded state. The expandable structure 320 has been expanded such that the upper platform 305 has been lifted or otherwise elevated upwards relative to the bottom base 325. The height of the upper platform 305 is thus greater when the expandable structure is expanded relative to when the expandable structure is contracted or folded. FIG. 4D shows the launch/recovery system 110 in a fully expanded state. Note that the opening 330 may decrease in size when the launch/recovery system is fully expanded such as by one or more panels being moved to a position that decreases the size of the opening 330 and also increases the flat, upper surface area of the upper platform 305.

Figure 5A:
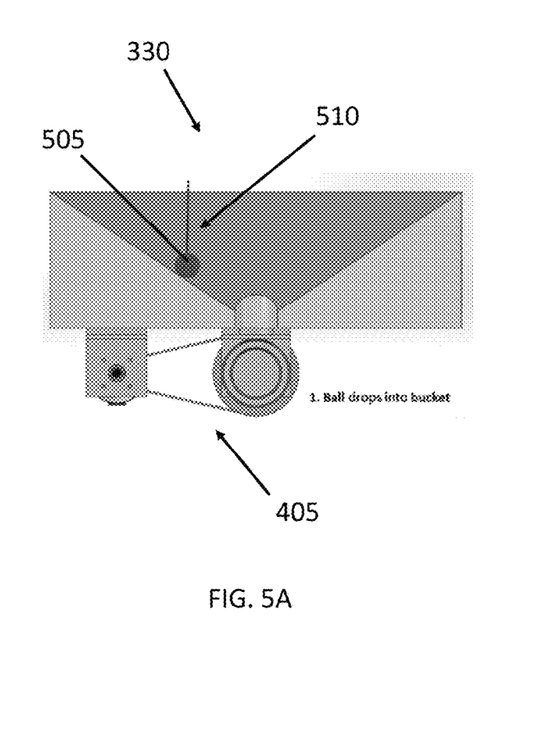
FIGS. 5A-5D show examples of an actuation mechanism of the launch/recovery system.
Figure 5B:
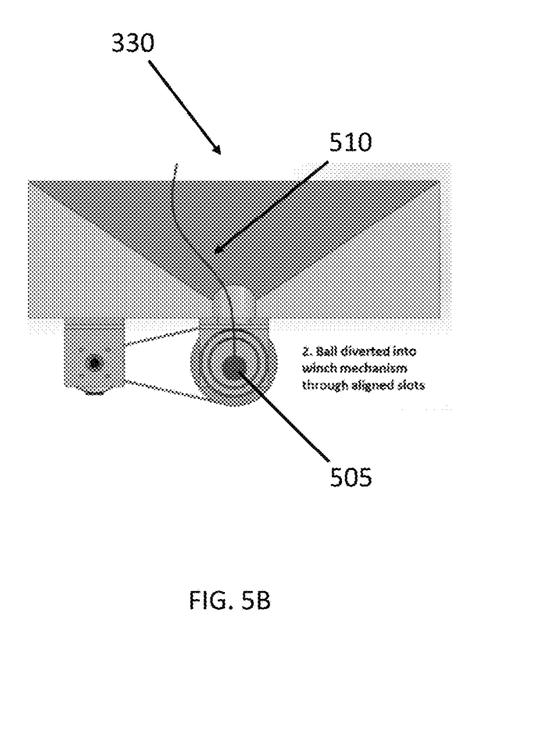

FIG. 5A shows a cross-sectional view of a portion of the upper platform showing the opening 330. The opening 330 (or structure that defines the opening) defines at least one sloped surface that leads to the winch mechanism or winch system 405, which is disposed within a housing of the upper platform. The winch system 405 is actuated by dropping a tethered actuation structure, such as a ball 505 into the opening 330. The ball can be attached to a tether 510 that is attached to the aircraft or other structure. As shown in FIG. 5B, the ball 505 drops into the winch mechanism 330 such as via a slot in a portion of a housing of the winch mechanism 330. The tethered actuation structure then mechanically engages the winch mechanism such as by wrapping around at least a portion of the winch mechanism such as a portion that causes the winch mechanism to wind.

Figure 5C:
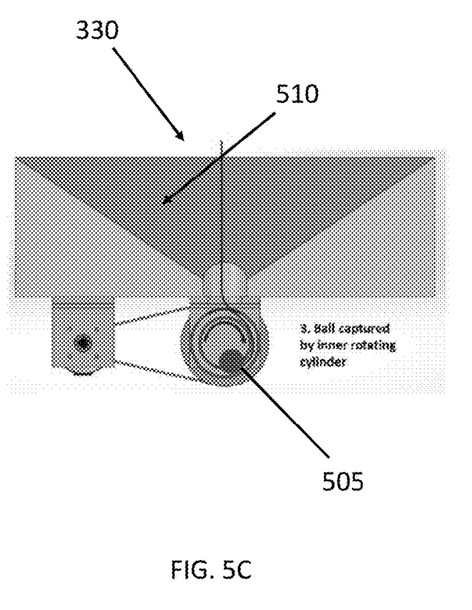
Figure 5D:
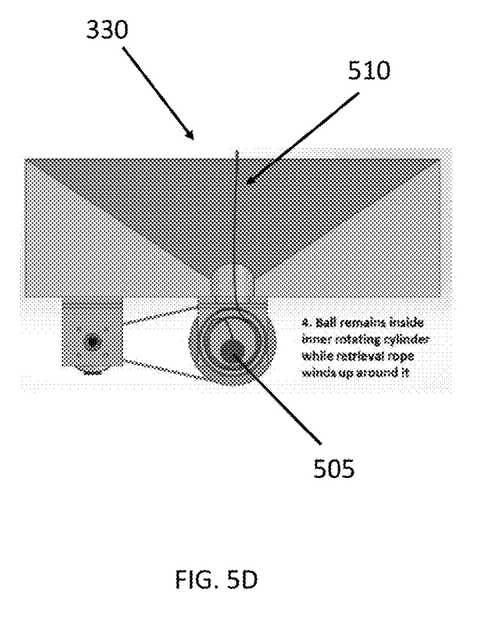

With reference to FIG. 5C, the ball 330 is captured within the winch mechanism, such as within a rotating cylinder. The cylinder rotates while the ball remains therein thereby causing the tether 510 to wind up around the cylinder (or another portion of the winch system) and thereby actuate the winch mechanism 330. The winch mechanism is mechanically coupled to the expandable structure 320 such that the winch mechanism 405 causes the expandable structure 320 to expand or contract as the winch mechanism is actuated.

The system can operate pursuant to method of use, such as a launch sequence. In an initial Setup step, an operator clears an area around the launch/recovery system, which is positioned on a deck of a seacraft for example. The operator performs UAV preflight procedures, if any. During this step, the upper platform 305 of the launch/recovery system 110 is at a level or vertical position that allows the human operator easy access to the UAV positioned upon the upper platform 305. For example, the upper platform can be at a height wherein an average human can physically touch the UAV while standing on the deck of the seacraft. In a subsequent Launch step, the upper platform 305 elevates (or self elevates) so that the UAV, which positioned on the upper platform 305, is clear of any objects in a surrounding area. A remotely controlled starter can be engaged to start the engine of the UAV. Retaining pins, if present, are removed to release the UAV from the launch/recovery system 110. This frees the UAV to climb vertically away from the launch/recovery system 110 and the seacraft. Once safely away from the seacraft, the UAV can then transition to cruising flight.

A method of use, such as an aircraft recovery sequence, is now described for the launch/recovery system. In an initial Capture step, the UAV automatically navigates to a pre-set position, such as in a hover state, above the upper platform 305 of the launch/recovery system 110. Once in stable hover, the UAV drops a tether 510 (FIGS. 5A-5D), such as a plum-bob-weighted 'capture' line. An operator can then insert the tether and attached ball 505 into the winch receptacle opening 330 or "bucket" of the launch/recovery system 110. The ball 505 then mechanically engages the winch system as described above. Tension can be applied to the tether to cause the tether and ball to wind the winch system and actuate the system. The upper platform 305 than can be winched down at a controlled rate. The UAV is then recovered securely on the upper platform and the locking pins are applied to secure the UAV to the launch/recovery system.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Although embodiments of various methods and devices are described herein in detail with reference to certain versions, it should be appreciated that other versions, embodiments, methods of use, and combinations thereof are also possible. Therefore, the spirit and endoscope of the appended claims should not be limited to the description of the embodiments contained herein.

The invention claimed is:

1. An aircraft launch/recovery system, comprising:
   an upper platform defining an upper surface sized and shaped to support an aircraft;
   a bottom platform configured to be positioned atop a surface of a seacraft;
   an expandable structure that mechanically links the upper platform to the bottom platform,
   wherein the expandable structure can transition between a folded state wherein the expandable structure is lowered relative to the bottom platform and an unfolded state wherein the expandable structure has an increased height that vertically raises the upper platform;
   a winch system mechanically coupled to the expandable structure, wherein the winch system actuates to transition the expandable structure between the folded state and the unfolded state;
   wherein an opening is positioned in the upper surface of the upper platform, and wherein the winch system is accessible via the opening such that the winch system is actuated via the opening; and
   wherein the winch system is actuated by inserting a tethered actuation structure into the opening such that the actuation structure mechanically engages the winch system.

2. The aircraft launch/recovery system of claim 1, wherein the actuation structure mechanically engages the winch system by winding around at least a portion of the winch system.

3. The aircraft launch/recovery system of claim 1, wherein the actuation structure is a ball.

4. The aircraft launch/recovery system of claim 1, wherein at least one extender wing is mechanically attached to the upper platform, the extender wing configured to move between a furled state and an unfolded state, wherein the extender wing increases a surface area of the upper surface when the extender wing is in the unfolded state.

5. The aircraft launch/recovery system of claim 4, wherein the extender wing automatically moves to the unfolded state as the expandable structure transitions to the expanded state.

6. The aircraft launch/recovery system of claim 1, further comprising the aircraft.

7. The aircraft launch/recovery system of claim 6, wherein the aircraft includes a tether that is attached to the tethered actuation structure.

8. The aircraft launch/recovery system of claim 7, wherein the aircraft is a Vertical Takeoff and Landing (VTOL) Unmanned Air Vehicle.

9. The aircraft launch/recovery system of claim 1, wherein the winch system is positioned inside a housing of the upper platform and below the opening in the upper surface.

10. The aircraft launch/recovery system of claim 9, wherein the opening is defined by a plurality of inclined surfaces.

11. The aircraft launch/recovery system of claim 10, wherein the inclined surfaces define a funnel that leads to the winch system positioned inside the housing.

12. The aircraft launch/recovery system of claim 1, the aircraft comprising:
   a fixed-wing aircraft;
   a gasoline powered engine coupled to the aircraft;
   an electrically powered engine coupled to the aircraft;

at least two propellers coupled to the aircraft, wherein the at least two propellers are coupled to at least one of the gasoline powered engine or the electrically powered engine;

wherein at least a first propeller of the at least two propellers rotates between a vertical orientation and a horizontal orientation.

13. The aircraft launch/recovery system of claim 12, wherein the at least two propellers include a front propeller connected to the electrically powered engine and a rear propeller connected to the gasoline powered engine.

14. The aircraft launch/recovery system of claim 12, wherein at least one propeller rotates between a vertical orientation and a horizontal orientation.

15. A method of recovering a Vertical Takeoff and Landing Unmanned Air Vehicle (UAV), comprising:

positioning the UAV above an aircraft launch/recovery system that includes:
 an upper platform defining an upper surface sized and shaped to support an aircraft;
 a bottom platform configured to be positioned atop a surface of a seacraft;
 an expandable structure that mechanically links the upper platform to the bottom platform, wherein the expandable structure can transition between a folded state wherein the expandable structure is lowered relative to the bottom platform and an unfolded state wherein the expandable structure has an increased height that vertically raises the upper platform;
 a winch system mechanically coupled to the expandable structure, wherein the winch system actuates to transition the expandable structure between the folded state and the unfolded state;
 wherein an opening is positioned in the upper surface of the upper platform, and wherein the winch system is accessible via the opening such that winch system is actuated via the opening dropping a tethered actuator into the opening;

actuating the winch system via the tethered actuator so that the expandable structure transitions to the folded state.

16. The method of claim 15, further comprising causing the tethered actuator to wind around at least a portion of the winch mechanism.

17. The method of claim 15, wherein the winch mechanism is positioned inside a housing of the upper platform.

18. The method of claim 15, wherein the upper surface of the upper platform undergoes a reduction in size as the expandable structure transitions to the folded state.

19. The method of claim 15, wherein the upper surface of the upper platform undergoes a reduction in size via at least one extender wing transitioning to a folded state.

* * * * *